United States Patent [19]

Fedotowsky et al.

[11] 3,763,372

[45] Oct. 2, 1973

[54] ZONE PLATE OPTICS MONOLITHICALLY INTEGRATED WITH PHOTOELECTRIC ELEMENTS

[75] Inventors: Andre Fedotowsky, Cap Rouge, Canada; Kurt Lehovec, Williamstown, Mass.

[73] Assignee: Inventors & Investors, Inc., Williamstown, Mass.

[22] Filed: Nov. 2, 1971

[21] Appl. No.: 194,999

Related U.S. Application Data

[63] Continuation-in-part of Ser. No. 32,160, April 27, 1970, Pat. No. 3,649,837.

[52] U.S. Cl. .............. 250/211 J, 250/216, 250/237, 313/108 D, 317/235 N

[51] Int. Cl. ....... H01j 1/62, H01j 3/14, H01l 11/00

[58] Field of Search .............. 350/162 ZP; 250/216, 250/237, 211 J, 217 SS; 313/108 D; 317/235 N

[56] References Cited

UNITED STATES PATENTS

| | | | |
|---|---|---|---|
| 3,569,997 | 3/1971 | Lehovec | 250/217 |
| 3,631,251 | 12/1971 | Lehovec | 250/220 M |

*Primary Examiner*—James W. Lawrence
*Assistant Examiner*—T. N. Grigsby

[57] ABSTRACT

Zone plate optics is monolithically integrated with a phase filter and a photoelectric element to provide an image conforming to the shape of the photoelectric element. Saving of space at optimized light input is achieved by multiple reflections of light beam or by close packing of optical elements in a two dimensional matrix of hexagonal symmetry.

16 Claims, 14 Drawing Figures

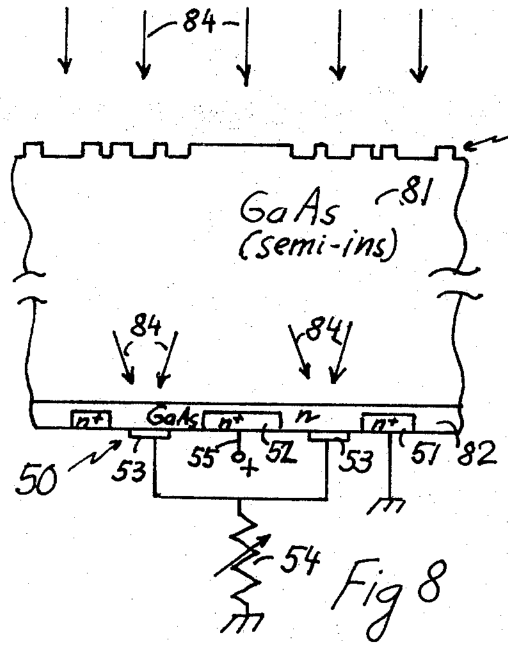
Fig 8
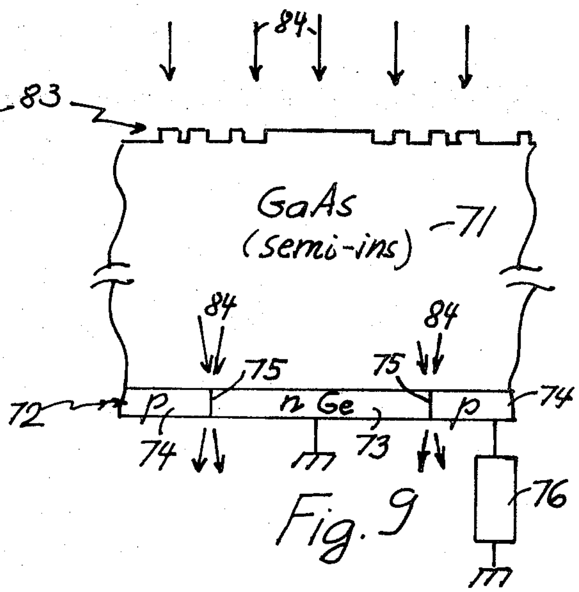
Fig. 9
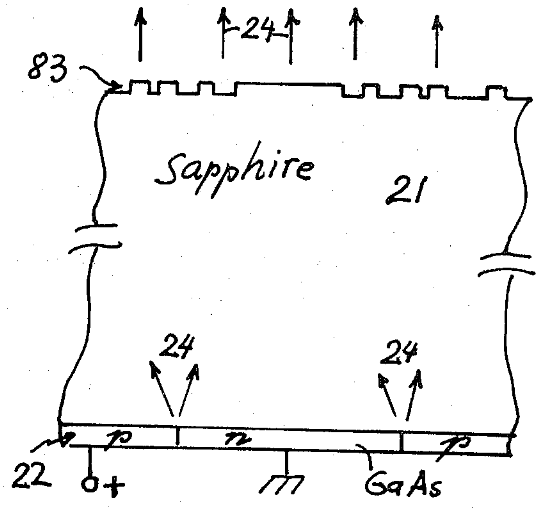
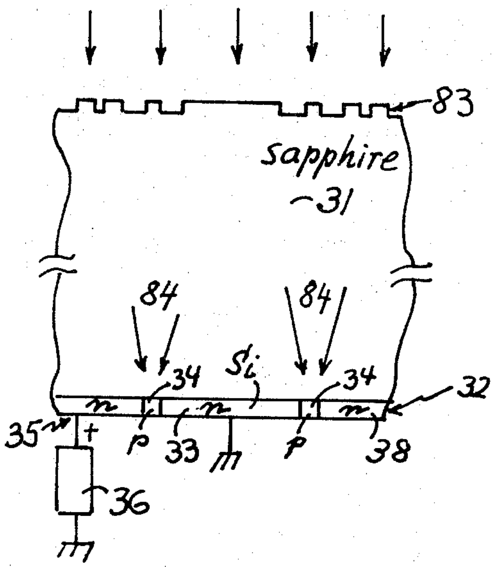
Fig. 10
Fig. 11

ZONE PLATE OPTICS MONOLITHICALLY INTEGRATED WITH PHOTOELECTRIC ELEMENTS

CROSS REFERENCE TO RELATED APPLICATION

This application is a continuation-in-part of U.S. application Ser. No. 32,160, now U.S. Pat. No. 3,649,837 filed on Apr. 27, 1970. The optics utilized in part of this invention is described in the copending application Ser. No. 194990, entitled PHASE FILTER COMBINATION WITH LENS OPTICS, filed concurrently with this application on Nov. 2, 1971 now abandoned.

BACKGROUND OF INVENTION

The invention herein described was made in the course of or under a contract with the United States Air Force.

This invention deals with monolithically integrated structures of optical and photoelectric elements. In particular, this invention deals with combinations of Fresnel optical lenses and photoelectric elements.

In U. S. Pat. No. 3,569,997, and several related patent applications, such as Ser. No. 32,160, the monolithic integration of zone plate optics with solid photoelectric elements, such as sensors of radiation, light emitters or light modulators was described.

A prime object of this monolithic integration was saving of space at optimum light input. For instance, the parent application Ser. No. 32,160 teaches a doubling of focal length without increasing substrate wafer thickness by reflection of the radiation on a wafer surface on its path between zone plate optics and sensor. However, for some applications, there is a need of further increase of focal length without increasing wafer thickness.

Two dimensional matrices of sensors integrated with zone plate optics call for an arrangement which maximizes the fraction of the surface space used for optical purposes.

Since the point image of a parallel monochromatic incident beam at a focal point of a zone plate lens is rather small, typically a few wavelengths only, rather accurate alignment of microsensor and zone plate optics is required in the manufacturing process of a monolithically integrated structure which poses manufacturing difficulties.

In some cases, sensors of shape different than point or disk are advantageous. In such cases, special optics is required to focus the light into an image conforming to the shape of the photoelectric elements.

Accordingly, it is an object of this invention to provide on a solid wafer a zone plate optics of a focal length which is at least three times the wafer thickness.

It is another object of this invention to teach an arrangement of zone plates into a two dimensional matrix providing excellent utilization of surface area for optical imaging purposes.

It is yet object of this invention to teach a preparation method providing a sensor self-aligned with a zone plate optics monolithically integrated with said sensor.

It is yet another object to teach advantageous configurations of photoelectric elements in combination with optics producing an image conforming to the configuration of the photoelectric element.

These and other objects will be described in what follows.

BRIEF SUMMARY OF THE INVENTION

A focal length of at least three times the wafer thickness is achieved by multiple reflections of the light beam between front and back surfaces of the substrate wafer on the path of the light beam from zone plate to sensor. Moreover, in the case of two reflections, where primary focal length ($F$) is three times wafer thickness ($D$) the secondary focal point F/3 coincides with wafer thickness so that constructive superposition of primary and secondary images at $F/3 = D$ is possible.

The maximum utilization of space for optical purposes in a two-dimensional matrix is achieved by using hexagonal closed packing, i.e., providing for each individual zone plate the space of a hexagonal cell having six identical nearest neighbors.

The self-alignment of zone plate optics with a sensor is achieved by first preparing the zone plate and then using said zone plate to focus radiation on or near the position where the sensor is to be located whereby the energy of said focussed radiation is a contributing factor in the preparation of the sensor.

The advantageous configuration of the photoelectric element is a closed line representing a p-n junction in an epitaxial layer oriented normal to the insulating substrate or else a narrow gate structure separating source from drain regions in conjunction with a lens-optics and a phase-shift filter. The optics is described in a copending application Ser. No. 194,990 entitled PHASE FILTER COMBINATION WITH LENS OPTICS filed concurrently with this application.

BRIEF DESCRIPTION OF FIGURES

FIG. 8 shows a ring-shaped sensor integrated with the gate of a field effect transistor monolithically integrated with optics of conforming image configuration.

FIG. 9 shows a ring-shaped light modulator monolithically integrated with optics of conforming image configuration.

FIG. 10 shows a ring-shaped light emitter monolithically integrated with optics of conforming image configuration.

FIG. 11 shows a bipolar phototransistor of ring-shaped base layer monolithically integrated with optics of conforming image configuration.

SPECIAL EMBODIMENTS

The diameter of a zone plate optics is limited by the resolution of the processing methods. Thus, we may equalize roughly the width W of the outermost ring-shaped half zone of a circular zone plate optics with about twice the resolution of the preparational process. For ordinary photolithographic methods, as used in contamporary microcircuit technology, $W$ is then about 2 microns.

The dimensions of a circular zone plate can be expressed in terms of the focal length $F$ and of the width $W$ of the outermost half zone, e.g., the outer radius is $$a = F\lambda/2W,$$

the number of full zones $$N = F\lambda/8W^2$$

and the radius of the Airy disk at the primary focal point is $$\sigma_A = 1.22\ W.$$

Thus, at a given value of $W$ and wavelength $\lambda$, an increase of aperture area $a^2\pi$ requires an increase in focal length.

Since it is often impractical to increase substrate wafer thickness $D$, which separates zone plate optics from the photoelectric element, designs are required whereby the focal length $F$ is a multiple of wafer thickness $D$.

Figures 1, 2, 3:
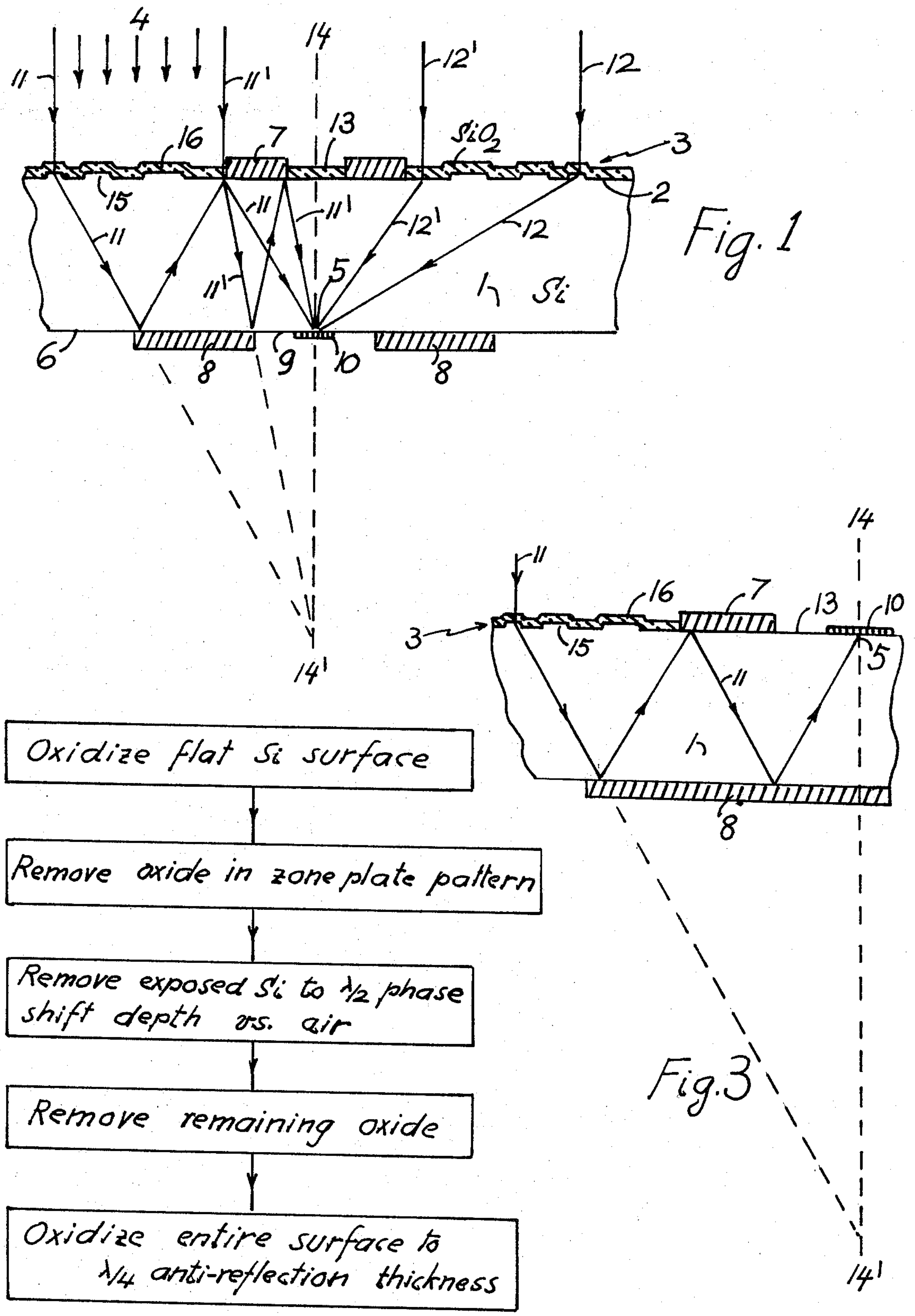
FIG. 1 shows in cross section a structure comprising a zone plate monolithically integrated with a sensor and using double reflections.
FIG. 2 illustrates the process steps for producing the zone plate optics of the structure of FIG. 1.
FIG. 3 shows in cross section a structure similar to that of FIG. 1, but using triple reflections.

FIG. 1 of this invention shows a structure using double reflections so that $F = 3D$.

Referring to FIG. 1, there is shown in cross section a structure of circular symmetry around optical axis 14—14'.

Horizontal and vertical dimensions in FIG. 1 and subsequent figures have not been drawn to scale to enable clearer perception of details.

The structure of FIG. 1 comprises a slab 1 of silicon, which carries on its front surface 2 annulus-shaped zone plate optics 3 which focusses incident parallel light beam 4 into focal point 5 on the back surface 6 after reflection on metallic mirrors 7 and 8. Back mirror 8 has a central opening 9 into which a disk-shaped Schottky barrier sensor 10 is placed.

The position of sensor 10 coincides with the primary focal point at distance $F = 3D$ of zone plate lens 3 including reflections and also with the secondary focal point at distance $F' = F/3 = D$ of zone plate lens without reflection.

Rays 11, 11' at the left side show light paths to the primary focal point, while rays 12, 12' at the right side show light paths to the secondary focal point.

Constructive interference results if $F - F' = 2D$ is an integer multiple of wavelength of radiation in silicon.

While the radiation energy in the image around focal point $F' = F/3$ is only 1/9 of that at $F$, the intensities at the very focal points $F$ or $F'$ are equal, difference in image energies resulting from the smaller size of the image at $F'$. Thus, for very small sensors, e.g., microplasm avalanche Schottky barrier diodes, the response can be increased by up to a factor of 4 by constructive superposition of the field intensities at $F$ and $F'$.

Note that for reflections of the beams into F, the central part of front mirror 7 is not required. Thus, central opening 13 of mirror 7 can be used as an active zone of the zone plate optics. The radii of the upper mirror 7 and lower mirror 8 expressed as fractions of outer radius $a$ of zone plate 3 are as follows: inner radius of 7 is $a/9$, outer radius of 7 is $a/3$; inner radius of 8 is $2a/9$; and outer radius of 8 is $2a/3$. Therefore, the energy incident on the opening in 7 is only $1/9^2$: $[1 - (1/3)^2] = 1/72$ of that incident on 3, so that the contributions of radiation incident on 13 to the intensity at 10 are minor.

Zone plate optics 3 comprises elevations such as 15 in the silicon surface of heights $h = \lambda_v/[2(n - 1)]$ where $\lambda_v$ is the vacuum wavelength of 4 and $n$ is the refractive index of the substrate. This causes a phase shift of $\pi$ ($= \lambda/2$). Because of this phase shift, both half zones contribute constructively to the intensity at the focal point 5. The surface of the zone plate is covered with an antireflection coating 16 of $SiO_2$ of thickness equal to a quarter wavelength. By this coating, reflection losses are reduced from 31 percent for the bare silicon surface to 4.7 percent for the $SiO_2$-coated surface. Using a $Si_3N_4$ coating, reflection losses can be reduced to 1.3 percent.

FIG. 2 shows a flow chart of a typical production process for preparation of the phase-shift zone plate lens with antireflection coating.

FIG. 3 shows a cross section along the optical axis through a design similar to that of FIG. 1, except that primary focal length is four times wafer thickness by using triple reflection. Focal point 5 lies here on the front surface and sensor 10 is placed, therefore, in the opening 13 of front mirror 7.

The structures of FIGS. 1 and 3 can be generalized to $F = pD$ by using $p - 1$ reflections. Considering zone plate optics of equal width W of the outermost zone, one has then for the outer radius of the zone plate $a_p = pa_1$ where $a_1$ is the outer radius for the design $F = D$ without reflection. The inner radius of the annulus-shaped zone plate is $a_p\,(p - 2)/p$ so that the area of the zone plate increases as the multiple $p^2[1 - (p - 2/p)^2] = 4(p - 1)$ of the area $a_1^2\pi$ of the design with $F = D$. Thus, the design $F = 3D$ has an eight-fold gain in intensity compared to the design with $F = D$, without considering the additional gain achievable by overlapping the foci $F = 3D$ and $F' = D$.

Figure 4:
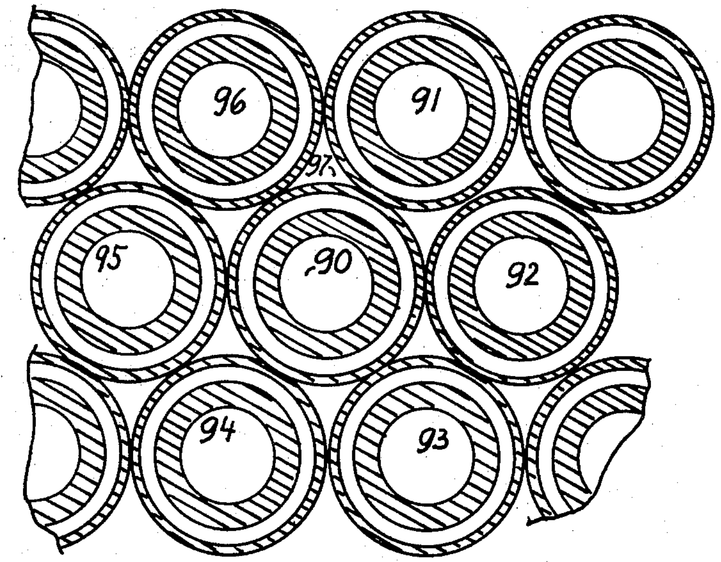
FIG. 4 shows a top view on an arrangement of zone plate optics in a two dimensional matrix for maximized utilization of incident radiation.

The integrated structure of a zone plate optics with a photoelectric element shown in FIGS. 1 and 3 involve a single optics and a single photoelectric element. Such structures can be arranged in two-dimensional matrices by placing them on the same substrate wafer so that all the optics is located on the same planar wafer surface. However, some space at the surface exposed to incident radiation is lost for optical purposes in the regions between individual circular optical structures. In order to minimize the loss, I have found that a hexagonal grid as shown in FIG. 4 in top view is preferable to the conventional cartesian rectangular coordinate grid. In the hexagonal grid, each circular zone plate lens, such as 90, has six nearest neighbors 91–96.

The fractions of surface space not used for optical purposes such as 97 in this arrangement is only $(2\sqrt{3} - \pi)/\pi = 10\ 2$ as compared to a $(4 - \pi)/\pi = 28$ percent loss in a quadratic coordinate system. The hexagonal arrangement is preferably also in cases where close-packed two dimensional matrices of circular zone plates or phase filters are desired without integration with photoelectric elements.

In preparing a zone plate optics monolithically integrated with a photoelectric element such as a microsensor, extremely precise alignment of the sensor with the optics is required. This poses some difficulty in production, especially when optics and sensor are on opposite sides of the wafer surface, as, for example, in the design of FIG. 1. This difficulty can be overcome by a production procedure which first prepares the zone plate optics and then utilizes it to focus radiation on the position where the sensor is to be located, the focussed radiation assisting in the preparation of the sensor. The procedure will be explained on hand of the structure shown in FIG. 5.

Figures 5, 6, 7:
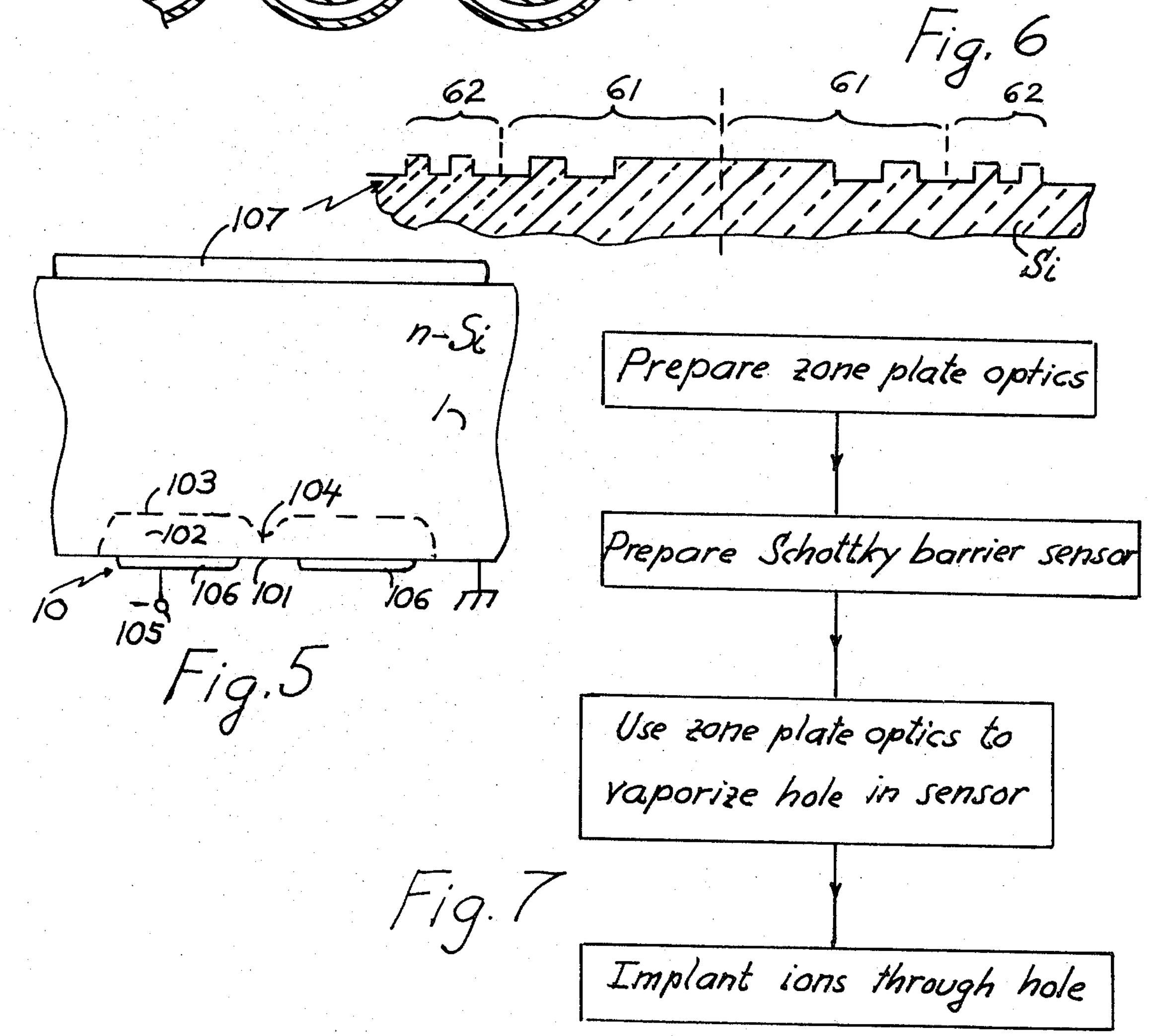
FIG. 5 shows in cross section an avalanche sensor design which lends itself to self-alignment with optics.
FIG. 6 shows a special zone plate optics to be used for the self-alignment of sensor of FIG. 5.
FIG. 7 shows a flow chart of a process for self-alignment of micro sensor and monolithically integrated optics.

The sensor 10 shown in FIG. 5 in cross section uses a disk-shaped Schottky barrier contact 106 with a small hole 101 of the order of only a few microns in its center. In the substrate adjacent to the Schottky barrier contact 106 there is a depletion region 102 whose boundary with respect to the electrically neutral bulk of the semiconducting substrate 1 is indicated by the dotted line 103. This boundary protrudes toward the Schottky barrier contact at a position opposite 101 because of an increase in the substrate dopant concentration in the region 104. This increase in dopant concentration can be produced conveniently by ion implant through the opening 101, the surrounding Schottky barrier contact 106 acting as a shield against implant in its underlying substrate. The procedure used here is the opposite to the well-known guard ring procedure whereby concentration in the substrate is decreased. The protrusion of 103 toward 101 causes a larger electric field at 106 in the vicinity of 101 so that avalanche breakdown first sets in in the vicinity of 101. This effectively reduces the sensitive area of 106 to a small region surrounding 101.

N-silicon substrate 1 is grounded and Schottky barrier contact 106 is reverse biased against 1 through contact 105. Zone plate optics 107 focusses radiation on the rim between 101 and 106.

FIG. 6 illustrates the zone plate optics 107 used in conjunction with the sensor 10 of FIG. 5. The zone plate optics 107 of FIG. 6 arises from an ordinary zone plate optics by changing the phases of the outer half 62 of the zone plate by $\lambda/2$. As a result, the field intensities focussed by the inner half 61 and by the outer half 62 into the focal point compensate each other by destructive interference. Thus, the intensity distribution in the image plane is displaced from the optical axis having a ring-shaped maximum at about the Airy disk radius, i.e., at a location where the intensity of the image of an ordinary zone plate, such as 3 in FIG. 1, has a minimum.

The steps to produce the self-aligned structure of FIG. 5 are listed briefly in FIG. 7. The procedure is as follows: First, the zone plate of FIG. 6 is prepared on substrate 1 by combining an ordinary zone plate with a phase filter of two half sections of equal area. Then a Schottky barrier contact is produced in the focal plane of the zone plate lens. By covering the outer half 62 and illuminating the Schottky barrier contact by strong light source through the inner half 61 of the zone plate, a strong light intensity is produced at the focal point. This intensity can be used to vaporize the circular hole 101, roughly of diameter of half the Airy disk from the Schottky barrier contact. Through this hole, dopant causing the same conductivity type as that of the substrate is implanted. This causes a particularly strong electric field at the rim of the Schottky barrier contact 106 surrounding hole 101. Using now the entire zone plate 60, the image of a plan incident radiation is focussed on the rim of hole 101.

Instead of vaporizing part of the Schottky barrier electrode, other processes such as fusion or alloying may be employed. For instance, local heating of a Pt layer on silicon can form a platinum silicide Schottky barrier contact. Moreover, exposure and thermal curing of a photoresist layer can be used for self-aligned processing of the sensor.

The principle of combining the zone plate optics with a phase shift filter to obtain maximum light intensity in a ring-shaped image configuration can be expanded to phase reversal in more than one section of the zone plate. In the copending application SN, it is described that the image is located at a ring of radius $$x_o = (2M - 1/4)\lambda F/2a$$

if the phase of the zone plate is shifted by $\lambda/2$ in each second of the annulus-shaped regions bounded by $r_{227}$ = $a/2M$ ( = 1, 2, . . . $2M$) when $a$ is the outer radius of the zone plate.

In many cases, the desirable shape of a photoelectric element is not a point or a disk, but a line or a circle. For instance, it has been found that a Schottky barrier avalanche sensor is particularly sensitive along its rim. Therefore, it is advantageous to replace the ordinary zone plate optics of FIG. 1 by a combined phase-filter zone plate optics, so that the incident radiation 4 in FIG. 1 is focussed on the rim of sensor 10 rather than on its center 8.

As a further step in this direction, a ring-shaped sensor can be used in conjunction with a phase-shift filter-lens combination. Several monolithically integrated designs of this type are shown in FIGS. 8–11.

Referring to FIG. 8, there is shown in cross section a semi-insulating GaAs slab 81 which carries on its upper surface a combined filter-zone plate lens 83 of the type described in SN. The lower surface of 81 has an epitaxial GaAs $n$-layer 82 on which a Schottky barrier field effect transistor 50 has prepared. This field effect transistor comprises the $n^+$-source 51, $n^+$-drain 52 and the ring-shaped Schottky barrier gate 53. The Schottky barrier gate is connected to source 51 over adjustable resistor 54. The drain 52 is positively biased against grounded source 51 through lead 55 by a power supply (not shown). Illumination of the gate by radiation 84 focussed by 83 on the circular gate 53 causes a photocurrent to flow through 54 and thereby changes the gate to source bias. This causes a change in drain current $\Delta I_D = R \cdot g \Delta I_G$, where $\Delta I_G$ is the gate photocurrent and g the transconductance. For $R > g^{-1}$, photocurrent amplification is obtained. However, the response time of the device is limited by the $RC_G$ time constant where $C_G$ is the gate capacitance, so that increasing the sensitivity by an increase in $R$ eventually results in loss of response time. It is advantageous to choose a channel dopant and channel height so that pinch-off voltage coincides with incipient avalanche operational mode of the Schottky barrier gate sensor 53.

Referring now to FIG. 9, there is shown in cross section a transparent semi-insulating GaAs substrate 71 carrying on its upper surface the combined phase-filter zone plate optics 83 and on its lower surface an epitaxial germanium layer 72. The central disk-shaped portion 73 of 72 is of n-conductivity, while the surrounding portion 74 of 72 is of p-conductivity type. 73 and 74 are separated by the circular p-n junction 75 onto which illumination 84 is focussed by 83. Provisions are made to apply electric bias to the p-n junction from power supply 76.

It is known that a p-n junction can serve as sensor of radiatin, or else a light emitter, or else as modulator of radiation depending on electric bias conditions and materials selected. Examples of suitable combinations are: The epitaxial Ge p-n junction 75 on semi-insulating GaAs substrate 71 of FIG. 9 used as a light modulator or properly selected radiation by means of the Franz-Keldysh effect. Or else the light emitting GaAs epitaxial p-n junction diode 22 on sapphire substrate 21 shown in cross section in FIG. 10. Combined phase filter zone plate lens 83 of FIG. 10 serves to focus the radiation 24 emitted from the circular junction of diode 22 into a parallel outgoing beam.

FIG. 11 shows in cross section a structure similar to that of FIG. 9 except that the epitaxial silicon film 32 on sapphire substrate 31 carries a lateral n-p-n structure comprising the disk-shaped central n-emitter portion 33, separated by the ring-shaped p-layer 34 from the outside n-collector 38. The regions 33, 34 and 38 represent an n-p-n phototransistor 35 biased by power supply 36. Instead of Si on sapphire, an epitaxial layer 32 of Ge on a semi-insulating GaAs substrate can be employed.

Figure 12:
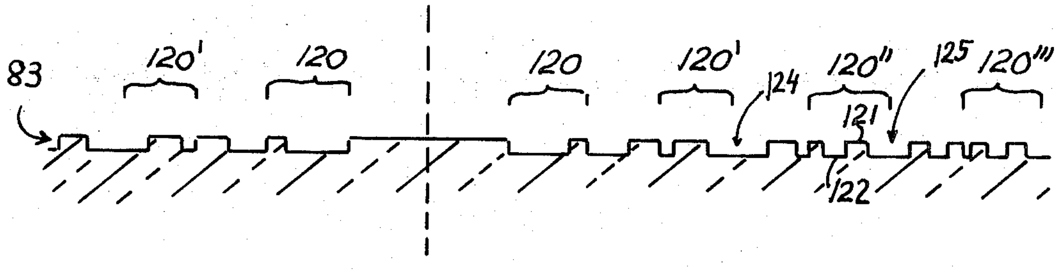
FIG. 12 illustrates an integrated zone plate phase filter optics to produce the annulus-shaped image conforming to the photoelectric structures of FIGS. 8 – 11.

FIG. 12 illustrates a cross section through an integrated zone plate, phase filter design 83 as might be used in the structures of FIGS. 8 – 11 for producing the ring-shaped radiation image. An ordinary circular zone plate comprising alternate half zones with phase shift of $\pi$, i.e., $\lambda/2$, against each other is modified in that hills and valleys of the ordinary zone plate have been exchanged in annular regions 120, 120′, 120″ and 120‴. The width and the spacing of these annular regions are equal. For instance, hill 121 in region 120″ would have been a valley in the zone plate without phase filter, while valley 122 in that region would have been a hill. At the positions 124 and 125, a step in the ordinary zone plate coincides with a boundary of the regions 120′ and 120″, respectively, of the phase filter, and is eliminated, therefore. The zone plate phase filter combination of FIG. 11 has not been provided with the anti-reflection coating of process FIG. 2 for sake of clarity of representation.

Figure 13:
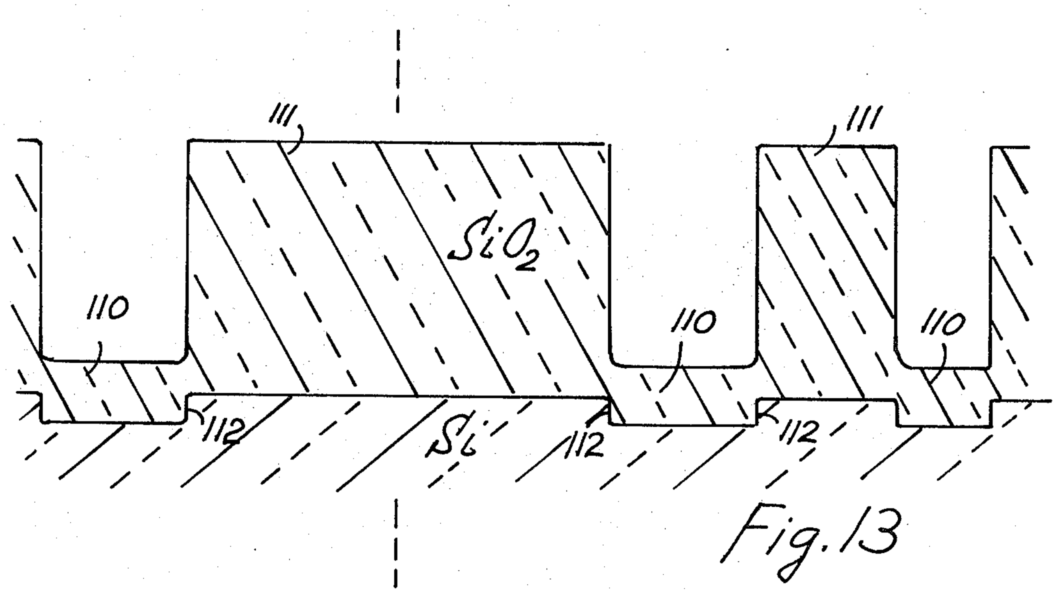
FIG. 13 is a cross section through a silicon $\lambda/2$-phased zone plate with $SiO_2$-antireflection coating of two thicknesses.

A different means for an antireflection coating of a $\lambda/2$-phase zone plate is illustrated in FIGS. 12 and 13.

FIG. 13 illustrates in cross section a $\lambda/2$-phase shift zone plate structure with antireflection coating. This structure differs from that of FIG. 6 in that $SiO_2$ films of two different thicknesses, 110, 111, are used to produce most of the $\lambda/2$-phase shift. These thicknesses are chosen to provide anti-reflection coatings of $\lambda/4n_1$ and $5\lambda/4n_1$, where $n_1 = 1.5$ is the refractive index of $SiO_2$. The small steps 112 in the silicon surface elevation between adjacent half zones is approximately 0.42 of the thickness $\lambda/4n_1$ and results conveniently from the preparational process outlined in FIG. 13. Elevations in FIG. 12 have been grossly exaggerated vs. horizontal distances for clarity of representation.

Upon oxidation of silicon to oxide thickness B, a silicon layer of thickness $C = B \times$ (density of $SiO_2$/density of Si) $x$ ( atomic weight of Si/molecular weight of $SiO_2$) $= 0.42\,B$ is consumed. We have discovered that for silicon with $n = 3.5$, and for $SiO_2$ with $n_1 = 1.5$, the zone plate phase shift relation $$n_1 A + nC - [n_1 B + A + C - B\ ] = \lambda/2$$

is approximately satisfied when $A = 5\lambda/4n_1$ and $B = \lambda/4n_1$ and $C \approx 0.42B$. In the case of $SiO_2$ where $n_1 = 1.5$, one has $A = 5\lambda/6$, $B = \lambda/6$ and $C = 0.42\lambda/6$.

Figure 14:
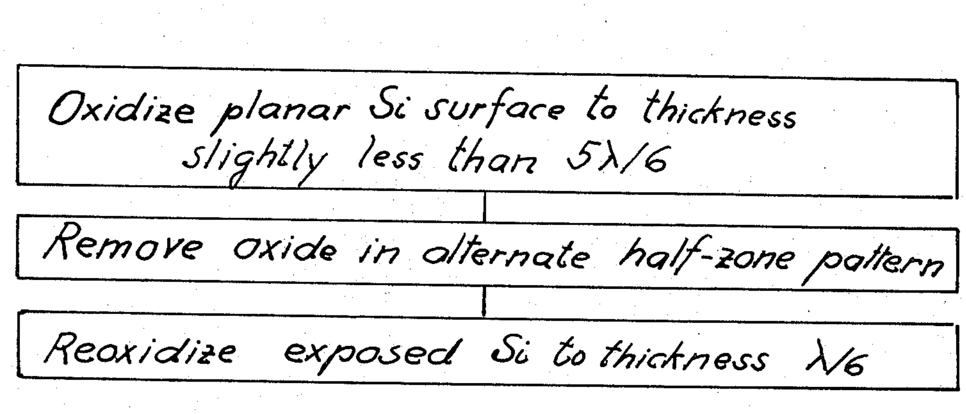
FIG. 14 lists the process steps to produce the structure of FIG. 13.

A typical production process for such a zone plate is outlined in FIG. 14. For the He-Ne radiation of $\lambda = 1.153$ microns, silicon is initially oxidized to 9,400 A by exposure to dry oxygen at 1,300°C for 12 hours; oxide is then removed in alternate half zones; and bare silicon is reoxidized to 1920 A by exposure to dry oxygen at 1,300°C for 48 minutes. During this second oxidation, the remaining thick oxide increases to approximately 9,600 A thickness and 800 A silicon are removed under the thin oxide.

It is obvious that photoelectric elements of configurations other than circles can be used with corresponding phase-filter zone plate lens optics described in copending SN.

This invention should not be limited by the preferred embodiment cited, but encompasses all structures or processes characterized by the following claims.

What is claimed is:

1. A zone plate optics monolithically integrated and optically aligned with a photoelectric element, said zone plate optics and said photoelectric element located on the surface of a solid substrate having two substantially parallel surface sections, whereby radiation focussed by said optics with respect to said photoelectric element is reflected at least once on each of said two parallel surface sections.

2. The structure of claim 1 whereby said reflecting surface sections are provided with metallic mirrors.

3. The structure of claim 1 whereby said photoelectric element is placed in a central opening of one of said reflecting surface sections.

4. The structure of claim 1 whereby the focal length of said zone plate optics is an integer multiple of the spacing of said surface sections, said integer being at least 3.

5. The structure of claim 4 whereby said integer is an odd number and said zone plate optics and said photoelectric element are arranged each coplanar with a different one of said surface sections.

6. The structure of claim 5 whereby the position of said photoelectric element is at the primary focal point and also at a secondary focal point of the zone plate lens.

7. The structure of claim 6 whereby said odd integer is 3 and said secondary focal point has a focal length one-third of the focal length of said primary focal point.

8. A zone plate optics integrated with a phase-shift filter to suppress intensity at the focal point on the optical axis and produce an intensity maximum in the focal plane along a line-shaped image contour sourrounding the optical axis in combination with a photoelectric element of a shape substantially congruent with said line-shaped image contour.

9. The structure of claim 8 whereby said image contour is a circle and said photoelectric element is ring-shaped of radius equal to said circle.

10. The structure of claim 8 whereby said photoelectric element is a light modulator.

11. The structure of claim 8 whereby said photoelectric element is a light emitter.

12. The structure of claim 8 whereby said photoelectric element is a sensor of radiation.

13. The structure of claim 12 whereby said sensor is the gate junction of a field effect transistor.

14. The structure of claim 8 whereby said photoelectric element is located in a thin epitaxial semiconducting layer on a substantially insulating substrate.

15. The structure of claim 14 whereby said photoelectric element comprises a first layer of one conductivity type in said epitaxial layer, surrounded by a second layer of the other conductivity type in said epitaxial layer, said image contour coinciding substantially with the p-n junction between said first and said second layers.

16. The structure of claim 15 whereby said second layer is in turn surrounded by a third layer of the same conductivity type as said first layer, the junctions between said first and said second layers, and between said second and said third layers substantially parallel to each other and closely spaced from each other, such as to enable transistor action across said second layer, said image contour substantially coinciding with said second layer.

* * * * *